(12) United States Patent
Soltani et al.

(10) Patent No.: US 12,549,423 B2
(45) Date of Patent: Feb. 10, 2026

(54) ESTIMATION OF POWER AMPLIFIER NONLINEARITY BASED ON MULTIPLEXED REFERENCE SIGNALS WITHIN A SLOT

(71) Applicant: QUALCOMM Incorporated, San Diego, CA (US)

(72) Inventors: Morteza Soltani, San Diego, CA (US); Jing Sun, San Diego, CA (US); Xiaoxia Zhang, San Diego, CA (US); Raviteja Patchava, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 18/103,380

(22) Filed: Jan. 30, 2023

(65) Prior Publication Data
US 2024/0259244 A1 Aug. 1, 2024

(51) Int. Cl.
*H04L 27/26* (2006.01)
(52) U.S. Cl.
CPC ...... *H04L 27/2613* (2013.01); *H04L 27/2636* (2013.01); *H04L 27/262* (2013.01)
(58) Field of Classification Search
None
See application file for complete search history.

(56) References Cited

U.S. PATENT DOCUMENTS

| | | | | |
|---|---|---|---|---|
| 2020/0313835 A1* | 10/2020 | Ji | ............ | H04L 27/2675 |
| 2021/0144657 A1* | 5/2021 | Ang | ............ | H04W 52/0261 |
| 2022/0360401 A1* | 11/2022 | Soltani | ............ | H04L 27/2607 |
| 2023/0016303 A1* | 1/2023 | Kutz | ............ | H04L 27/2614 |

OTHER PUBLICATIONS

3GPP TS 38.300 version 17.2.0 Release 17 titled 5G; NR; NR and NG-RAN Overall description; Stage-2 (Year: 2022).*
Vineeth S. Varma, Elena Veronica Belmega, Merouane Debbah, Samson Lasaulce, Energy Efficient Communications in MIMO Wireless Channels: Information Theoretical Limits, CRC Press, pp. 12-54, 2012. (Year: 2012).*

* cited by examiner

*Primary Examiner* — Ayaz R Sheikh
*Assistant Examiner* — Christopher R Davis
(74) *Attorney, Agent, or Firm* — Kevin M. Donnelly; Seyfarth Shaw LLP

(57) ABSTRACT

A method for wireless communication by a user equipment (UE) includes transmitting, to a network node, a first message indicating a capability of the UE to transmit a multiplexed low peak-to-average power ratio (PAPR) demodulation reference signal (DM-RS) and a high PAPR reference signal (RS) within a single slot. The method also includes multiplexing, associated with the capability, the low PAPR DM-RS with the high PAPR RS within the single slot. The method further includes transmitting, to the network node, the multiplexed low PAPR DM-RS and high PAPR RS within the single slot.

30 Claims, 10 Drawing Sheets

ESTIMATION OF POWER AMPLIFIER NONLINEARITY BASED ON MULTIPLEXED REFERENCE SIGNALS WITHIN A SLOT

FIELD OF THE DISCLOSURE

The present disclosure relates generally to wireless communications, and more specifically to estimating a power amplifier nonlinearity based on multiplexed reference signals within a slot.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communication network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Wireless communication devices, such as UEs and network nodes, may use a power amplifier (PA) to increase signal power to improve transmission quality. Specifically, the PA may amplify a gain of a signal. In some cases, a PA may generate nonlinear distortions because, after a PA saturation point, an increase in the power of a signal input to the PA does not generate a proportionate increase in the amplitude of the signal output from the PA. The nonlinear distortions may interfere with the signal that is output from the PA (in-band distortion). Additionally, or alternatively, the nonlinear distortions may interfere with one or more signals in adjacent frequency bands (out-of-band interference). In-band distortion may degrade reception performance. Out-of-band interference may decrease network quality for wireless communication systems operating in the adjacent frequency bands. To reduce the effects of nonlinear distortions on both in-band and out-of-band communications, the PA should operate in, or close to, a linear region in which the output power is proportional to the input power.

SUMMARY

In one aspect of the present disclosure, a method for wireless communication by a user equipment (UE) includes transmitting, to a network node, a first message indicating a capability of the UE to transmit a multiplexed low peak-to-average power ratio (PAPR) demodulation reference signal (DM-RS) and a high PAPR reference signal (RS) within a single slot. The method further includes multiplexing, associated with the capability, the low PAPR DM-RS with the high PAPR RS within the single slot. The method still further includes transmitting, to the network node, the multiplexed low PAPR DM-RS and high PAPR RS within the single slot.

Another aspect of the present disclosure is directed to an apparatus including means for transmitting, to a network node, a first message indicating a capability of the UE to transmit a multiplexed low PAPR DM-RS and a high PAPR RS within a single slot. The apparatus further includes means for multiplexing, associated with the capability, the low PAPR DM-RS with the high PAPR RS within the single slot. The apparatus still further includes means for transmitting, to the network node, the multiplexed low PAPR DM-RS and high PAPR RS within the single slot.

In another aspect of the present disclosure, a non-transitory computer-readable medium with non-transitory program code recorded thereon is disclosed. The program code is executed by a processor and includes program code to transmit, to a network node, a first message indicating a capability of the UE to transmit a multiplexed low PAPR DM-RS and a high PAPR RS within a single slot. The program code further includes program code to multiplex, associated with the capability, the low PAPR DM-RS with the high PAPR RS within the single slot. The program code still further includes program code to transmit, to the network node, the multiplexed low PAPR DM-RS and high PAPR RS within the single slot.

Another aspect of the present disclosure is directed to an apparatus for wireless communication at a UE. The apparatus includes a processor, and a memory coupled with the processor and storing instructions operable, when executed by the processor, to cause the apparatus to transmit, to a network node, a first message indicating a capability of the UE to transmit a multiplexed low PAPR DM-RS and a high PAPR RS within a single slot. Execution of the instructions further cause the apparatus to multiplex, associated with the capability, the low PAPR DM-RS with the high PAPR RS within the single slot. Execution of the instructions also cause the apparatus to transmit, to the network node, the multiplexed low PAPR DM-RS and high PAPR RS within the single slot.

In one aspect of the present disclosure, a method for wireless communication by a network node includes transmitting a first message indicating a capability of the network node to transmit a multiplexed low PAPR DM-RS and another PAPR RS within a single slot. The method further includes multiplexing, associated with the capability, the low PAPR DM-RS with the high PAPR RS within the single slot. The method still further includes transmitting the multiplexed PAPR DM-RS and high PAPR RS within the single slot.

Another aspect of the present disclosure is directed to an apparatus including means for transmitting a first message indicating a capability of the network node to transmit a multiplexed low PAPR DM-RS and another PAPR RS within a single slot. The apparatus further includes means for multiplexing, associated with the capability, the low PAPR DM-RS with the high PAPR RS within the single slot. The apparatus still further includes means for transmitting the multiplexed PAPR DM-RS and high PAPR RS within the single slot.

In another aspect of the present disclosure, a non-transitory computer-readable medium with non-transitory program code recorded thereon is disclosed. The program code is executed by a processor and includes program code to transmit a first message indicating a capability of the network node to transmit a multiplexed low PAPR DM-RS and another PAPR RS within a single slot. The program code further includes program code to multiplex, associated with the capability, the low PAPR DM-RS with the high PAPR RS within the single slot. The program code still further includes program code to transmit the multiplexed PAPR DM-RS and high PAPR RS within the single slot.

Another aspect of the present disclosure is directed to an apparatus for wireless communication at a network node. The apparatus includes a processor, and a memory coupled with the processor and storing instructions operable, when executed by the processor, to cause the apparatus to transmit a first message indicating a capability of the network node to transmit a multiplexed low PAPR DM-RS and another PAPR RS within a single slot. Execution of the instructions further cause the apparatus to multiplex, associated with the capability, the low PAPR DM-RS with the high PAPR RS within the single slot. Execution of the instructions also cause the apparatus to transmit the multiplexed PAPR DM-RS and high PAPR RS within the single slot.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
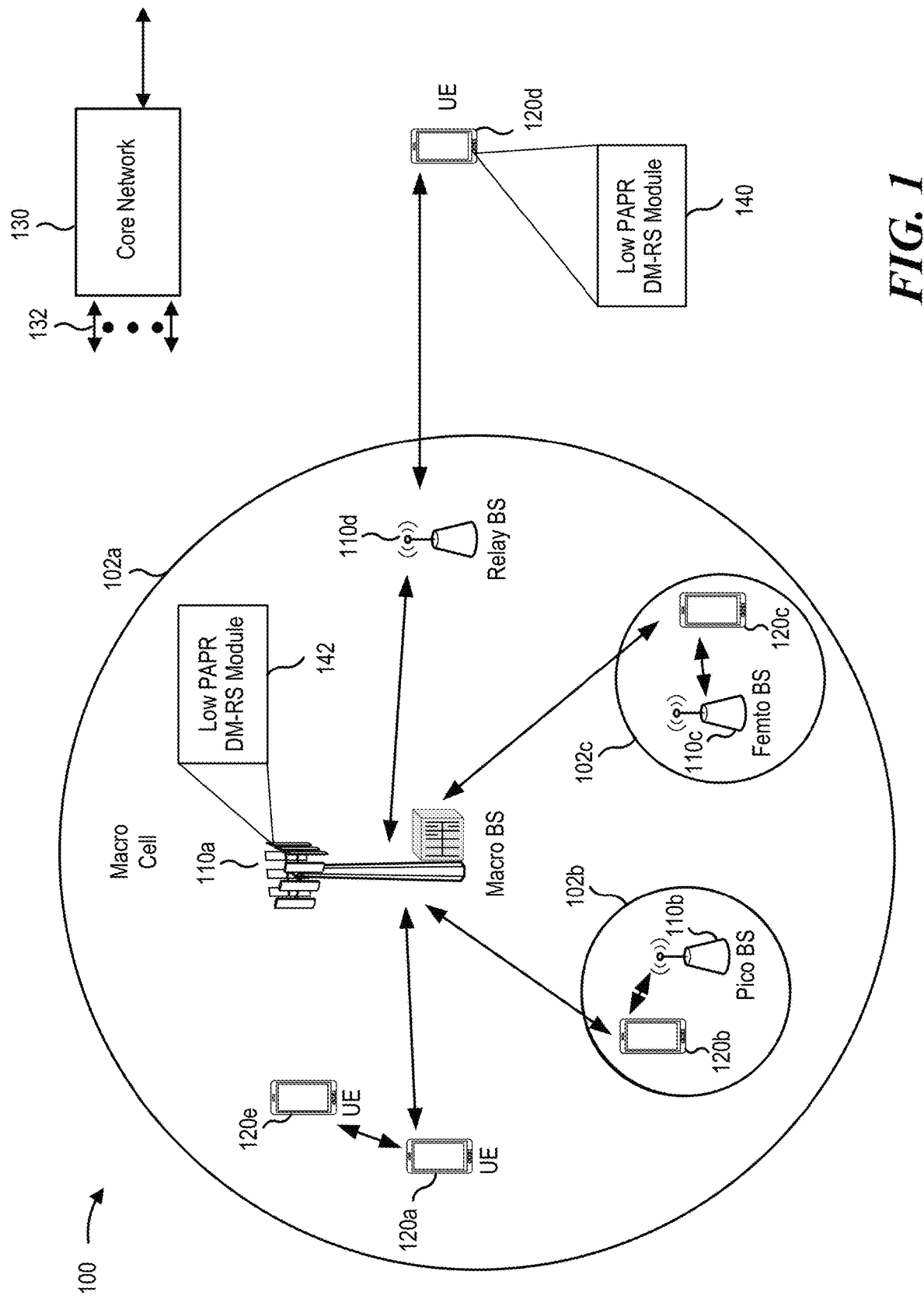
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G wireless technologies, aspects of the present disclosure can be applied in other generation-based communications systems, such as and including 6G and later wireless technologies.

Wireless communication devices, such as user equipment (UEs) and network nodes, may use a power amplifier (PA) to increase signal power to improve transmission quality. Specifically, the PA may amplify a gain of a signal. In some cases, a PA may generate nonlinear distortions because, after a PA saturation point, an increase in the power of a signal input to the PA does not generate a proportionate increase in the amplitude of the signal output from the PA. The nonlinear distortions may interfere with the signal that is output from the PA (in-band distortion). Additionally, or alternatively, the nonlinear distortions may interfere with one or more signals in adjacent frequency bands (out-of-band interference). In-band distortion may degrade reception performance. Out-of-band interference may decrease network quality for wireless communication systems operating in the adjacent frequency bands. To reduce the effects of nonlinear distortion on both in-band and out-of-band communications, the PA or a component of a wireless device associated with the PA may apply a power backoff may be applied so that the PA may operate farther away from the PA saturation point in its linear region. The linear region is an example of a region in which the output power is proportional to the input power. Application of the power backoff reduces transmission power, resulting in reduced PA efficiency. The reduced PA efficiency may increase power inefficiency at the wireless communication device. Additionally, or alternatively, the reduced PA efficiency may degrade the performance of a communication channel.

In some examples, a demodulation reference signal (DM-RS) may be used for channel estimation. In some such examples, the DM-RS may have an orthogonal frequency division multiplexing (OFDM) waveform. In examples in which a PA is operating in its nonlinear region and in which an OFDM waveform is used, data transmissions and DM-RS transmissions may have a similar peak-to-average power ratio (PAPR) profile. Therefore, both the data transmissions and the DM-RS transmissions may experience the same nonlinear distortion. An accuracy of a linear channel estimate, based on measurements of one or more DM-RSs, may be reduced in the presence of nonlinear distortion. As discussed, a power backoff may be applied to reduce the nonlinear distortion, but an efficiency of a PA may be reduced when a power backoff is applied. Therefore, applying a power backoff to a DM-RS to improve linear channel estimation may increase power inefficiency at a wireless communication device.

Various aspects of the present disclosure are directed to improving channel estimates for OFDM waveforms, and more particularly, to estimating a PA nonlinearity based on multiplexed reference signals. In some examples, the PA nonlinearity estimate may include an estimate of an amplitude in-amplitude out curve and/or an amplitude in-phase out curve associated with the PA. Some aspects are specifically directed to wireless communication devices operating in higher frequency bands. PA nonlinearity may be a primary cause of nonlinearity in higher frequency bands, such as frequency range four (FR4) and higher bands. In some examples, a first wireless communication device, such as a UE or a network node, multiplexes a low PAPR DM-RS with a high PAPR RS in a single slot, and transmits the multiplexed low PAPR DM-RS and the high PAPR RS to a second wireless communication device in the single slot. The low PAPR DM-RS may have a discrete Fourier transform (DFT) spread orthogonal frequency division multiplexing (OFDM) (DFT-s-OFDM) waveform or use a Zadoff-Chu Sequence. Additionally, the high PAPR RS may have an OFDM waveform. In some examples, prior to multiplexing and transmitting the low PAPR DM-RS and the high PAPR RS, the first wireless communication device may transmit, to the second wireless communication device, a message indicating a capability of the first wireless communication device to multiplex and transmit the low PAPR DM-RS and the high PAPR RS. In some examples, a PAPR of the low PAPR DM-RS is less than a PAPR threshold, and a PAPR of the high PAPR RS is greater than or equal to the PAPR threshold. PA nonlinearity may not affect the low PAPR DM-RS. Therefore, in some such examples, the low PAPR DM-RS may be specifically used by the second wireless communication device for channel measurements and estimation. Additionally, PA nonlinearity may affect the high PAPR DM-RS. Thus, the high PAPR RS may be specifically used to estimate nonlinearity in the operation of the PA at the first wireless communication device and to mitigate the associated nonlinearity distortion.

Particular aspects of the subject matter described in this disclosure may be implemented to realize one or more of the following potential advantages. In some examples, by multiplexing a low PAPR DM-RS with a high PAPR RS and transmitting the multiplexed low PAPR DM-RS and the high PAPR RS, techniques disclosed may improve an accuracy of channel estimates based on measurements of the low PAPR DM-RS at a receiver. The addition of the high PAPR RS may be used to mitigate nonlinearity distortion, thereby reducing in-band interference and out-of-band interference.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with UEs and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a low PAPR DM-RS module 140. For brevity, only one UE 120d is shown as including the low PAPR DM-RS module 140. The low PAPR DM-RS module 140 may perform one or more steps described with reference to the process 700 described with reference to FIG. 7.

The base stations 110 may include a low PAPR DM-RS module 142. For brevity, only one base station 110a is shown as including the low PAPR DM-RS module 142. The low PAPR DM-RS module 142 may perform one or more steps described with reference to the process 900 described with reference to FIG. 9.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
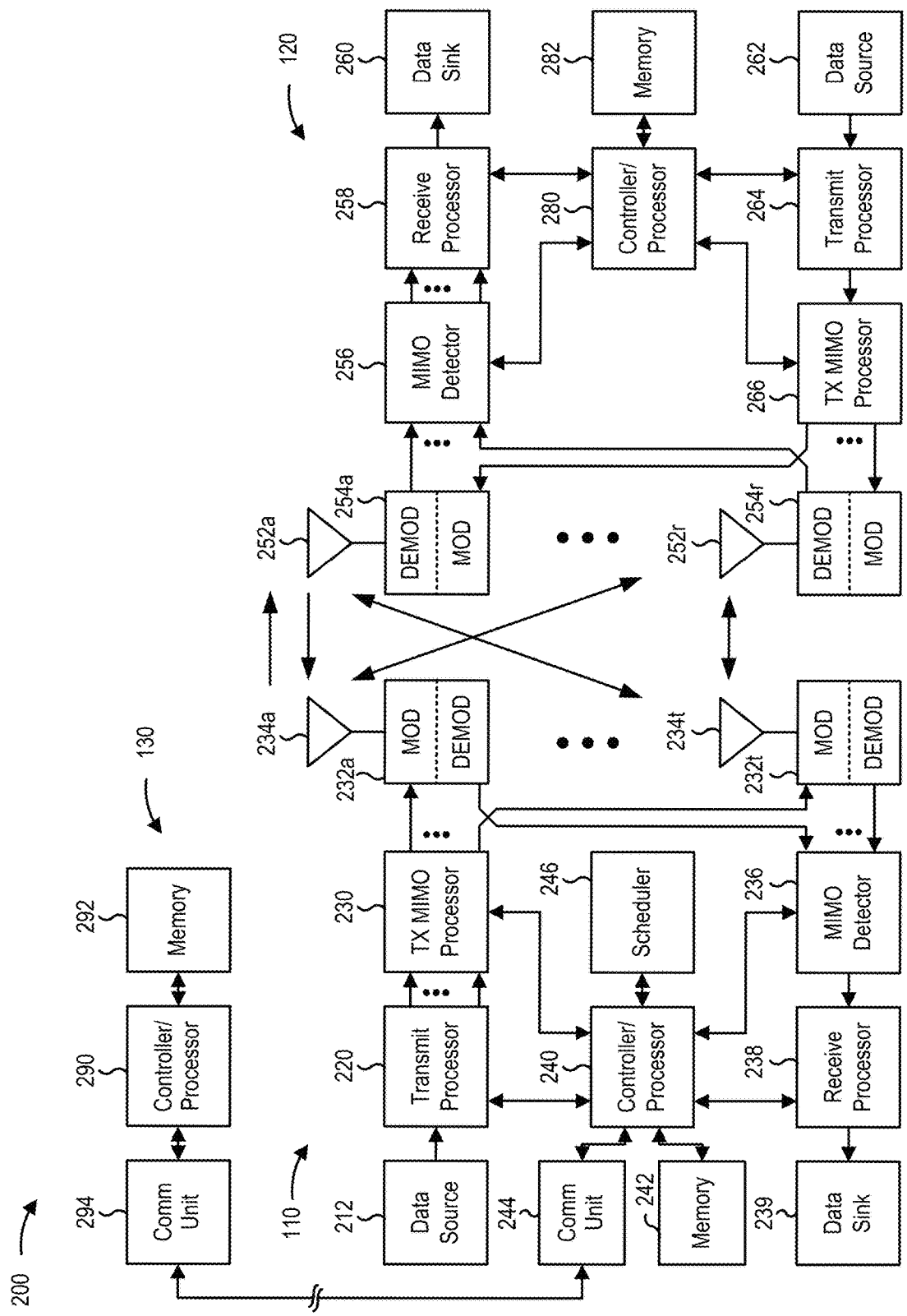
FIG. 2 is a block diagram conceptually illustrating an example of a base station in communication with a user equipment (UE) in a wireless communication network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with configuring one or more power saving functions as described in more detail elsewhere. For example, the controller/processor 240 of the base station 110, the controller/processor 280 of the UE 120, and/or any other component(s) of FIG. 2 may perform or direct operations of, for example, the processes of FIGS. 7, 8, and 9 and/or other processes as described. Memories 242 and 282 may store data and program codes for the base station 110 and UE 120, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
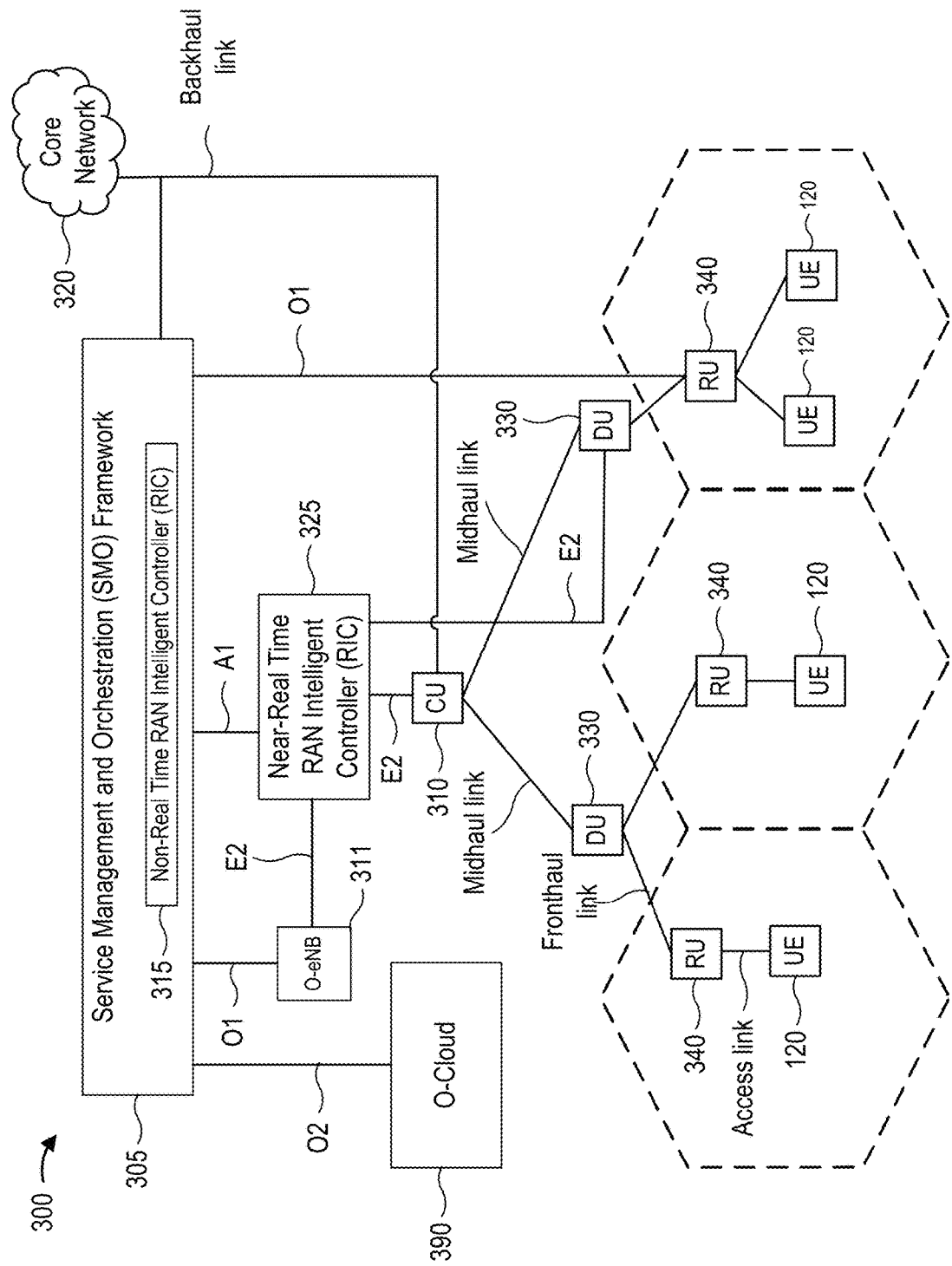
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Wireless communication devices, such as UEs and network nodes, may use a power amplifier (PA) to increase signal power to improve transmission quality. Specifically, the PA may amplify a gain of a signal. In some cases, a PA may generate nonlinear distortions because, after a PA saturation point, an increase in the power of a signal input to the PA does not generate a proportionate increase in the amplitude of the signal output from the PA. The nonlinear distortions may interfere with the signal that is output from the PA (in-band distortion). Additionally, or alternatively, the nonlinear distortions may interfere with one or more signals in adjacent frequency bands (out-of-band interference). In-band distortion may degrade reception performance. Out-of-band interference may decrease network quality for wireless communication systems operating in the adjacent frequency bands.

In some examples, to reduce the effects of nonlinear distortion on both in-band and out-of-band communications, the PA or a component of a wireless device associated with the PA may apply a power backoff so that the PA operates in a linear region. The power backoff may reduce transmission power, thereby reducing PA efficiency. The reduced PA efficiency may increase power inefficiency at the wireless communication device. Additionally, or alternatively, the reduced PA efficiency may degrade the performance of a communication channel.

Additionally, or alternatively, a spectral mask may be used to reduce interference on adjacent bands. The spectral mask may limit radiation at frequencies beyond a necessary bandwidth. The spectral mask may be defined based on out-of-band criteria, such as an adjacent channel leakage ratio (ACLR), in-band criteria, such as total in-band transmission power, and a power class. In some cases, spectral masks may be defined for lower bands, such as frequency range one (FR1), frequency range two (FR2), or frequency range three (FR3). However, spectral masks have not yet been defined for higher bands, such as FR4 or higher. Higher bands, such as FR4 or higher, may use an OFDM based waveform that is backward compatible with lower bands, such as FR1 and FR2. In scenarios where energy efficiency is not specified, the higher bands may use the OFDM based waveform to improve spectral efficiency. In some cases, where energy efficiency is specified, the higher bands may use a single carrier waveform.

In some wireless communication systems, such as 5G or later, a receiver may measure a DM-RS, and the DM-RS measurements may be used to estimate a channel. An uplink DM-RS may have a discrete Fourier transform (DFT) spread orthogonal frequency division multiplexing (OFDM) (DFT-s-OFDM) waveform. Alternatively, an uplink and downlink DM-RS may both use an OFDM waveform. In the presence of a nonlinear PA with an OFDM waveform, data transmissions and DM-RS transmissions may have a similar peak-to-average power ratio (PAPR) profile. Therefore, both the data transmissions and the DM-RS transmissions may experience the same nonlinear distortion. An accuracy of a linear channel estimate, based on measurements of one or more DM-RSs, may be reduced in the presence of nonlinear distortion. As discussed, an efficiency of a nonlinear PA may be reduced when a power backoff is applied to cause the nonlinear PA to operate farther from the PA saturation point. Therefore, applying a power backoff to a DM-RS to improve linear channel estimates may increase power inefficiency at a wireless communication device.

To improve channel estimates of channels using an OFDM waveform on higher bands (for example, FR4 or higher), a low PAPR DM-RS may be multiplexed with a high PAPR RS, and the multiplexed low PAPR DM-RS and the high PAPR RS may be transmitted to a receiver (for example, a UE or a network node). The low PAPR DM-RS refers to a DM-RS that uses a waveform with a PAPR that is less than a PAPR threshold. The low PAPR DM-RS may improve an accuracy of channel estimates (for example, linear channel estimates). The low PAPR DM-RS may use a Zadoff-Chu sequence, in a time domain or a frequency domain. Additionally, or alternatively, the low PAPR DM-RS may use a DFT-s-OFDM waveform. The high PAPR RS refers to an RS that uses a waveform with a PAPR that is greater than or equal to the PAPR threshold. The high PAPR RS may use the OFDM waveform to mitigate nonlinear distortion. In some examples, the high PAPR RS may use a frequency domain quadrature phase shift keying (QPSK) modulated gold sequence. Because PA nonlinearity does not frequently change, the high PAPR RS may be periodically transmitted. For example, the high PAPR RS may not be transmitted in every slot.

Higher bands, such as FR4 and higher, may use narrow beams. Therefore, spectral mask specifications for higher bands may be less stringent in terms of ACLR compliance in comparison to lower bands, such as FR1, FR2, and FR3. Thus, for the higher bands, a transmitter may not apply digital pre-distortion (DPD) to linearize PA nonlinearity. Because the DPD may not be specified, a crest factor reduction (CFR) block to control the PAPR of the waveform may not be specified. As a result, at the transmitter, a source of nonlinearity for the higher bands may be limited to the PA nonlinearity, which does not change frequently.

Figure 4:
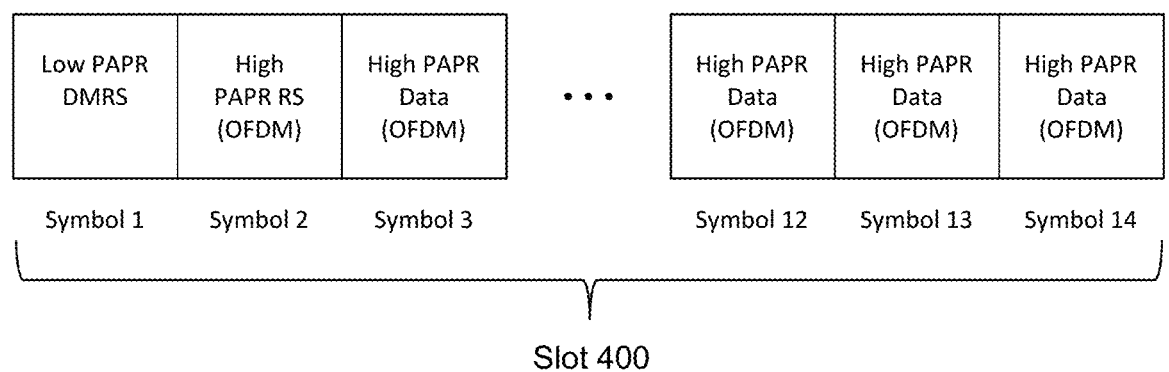
FIG. 4 is a block diagram illustrating an example of a multiplexed low peak-to-average power ratio (PAPR) demodulation reference signal (DM-RS) and a high PAPR reference signal (RS) within a single slot, in accordance with various aspects of the present disclosure.

Various aspects of the present disclosure are directed to improving channel estimates for OFDM waveforms, on higher bands (for example, FR4 and higher) associated with a nonlinear PA. FIG. 4 is a block diagram illustrating an example of a multiplexed low PAPR DM-RS and high PAPR RS within a single slot 400, in accordance with various aspects of the present disclosure. As shown in the example of FIG. 4, the low PAPR DM-RS in a first symbol (shown as symbol 1) of the slot 400 may be multiplexed with the high PAPR RS in a second symbol (shown as symbol 2) of the slot 400. The remaining symbols (for example, symbols 3 to 14) may be used for high PAPR data transmissions. In some examples, a first wireless communication device, such as a UE or a network node, multiplexes the low PAPR DM-RS with the high PAPR RS, and transmits the multiplexed low PAPR DM-RS and the high PAPR RS, within the single slot 400, to a second wireless communication device. In some examples, the low PAPR DM-RS may use a low PAPR waveform, such as a DFT-s-OFDM waveform. Additionally, or alternatively, the low PAPR DM-RS may use a Zadoff-Chu sequence, for MCS, in a time or frequency domain. The high PAPR RS may use an OFDM waveform.

Figure 5A:
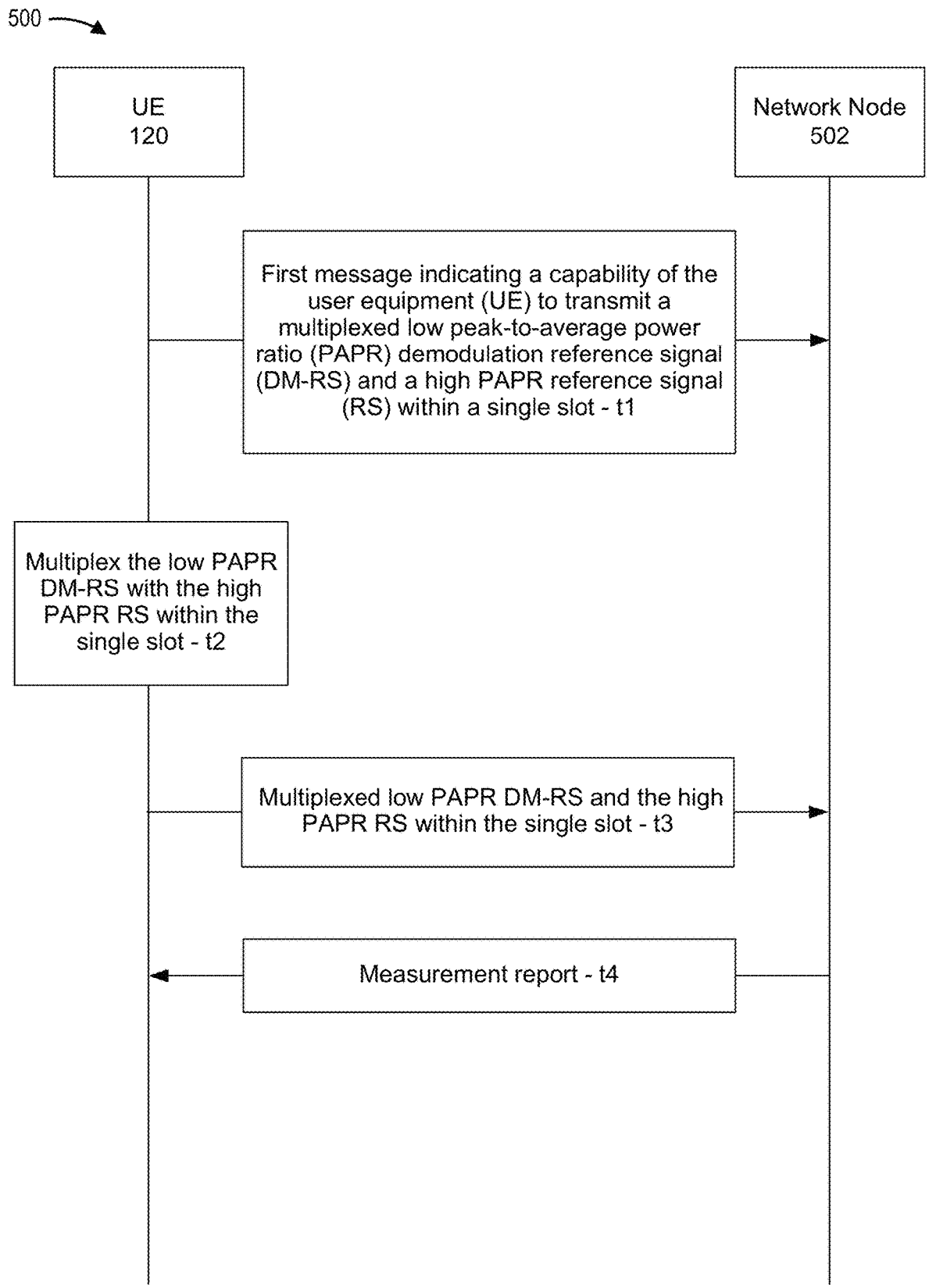
FIG. 5A is a timing diagram illustrating an example of multiplexing a low PAPR DM-RS and a high PAPR RS at a UE, in accordance with various aspects of the present disclosure.

FIG. 5A is a timing diagram 500 illustrating an example of multiplexing a low PAPR DM-RS and a high PAPR RS at a UE 120, in accordance with various aspects of the present disclosure. As shown in the example of FIG. 5A, the UE 120 may communicate with a network node 502. The network node 502 may be an example of a base station 110 as described with reference to FIGS. 1 and 2, a CU 310, DU 330, or RU 340 as described with reference to FIG. 3. In the example of FIG. 5A, the UE 120 may communicate with the network node 502 on higher band (for example, FR4 and higher).

As shown in FIG. 5A, at time t1, the UE 120 may transmit, to the network node 502, a first message indicating a capability of the UE to transmit a multiplexed low peak-to-average power ratio (PAPR) demodulation reference signal (DM-RS) and a high PAPR reference signal (RS) within a single slot. The first message may be a dynamic message included in uplink control information (UCI) or a medium access control (MAC) control element (CE) (MAC-CE). Alternatively, the first message may be a static message included in an RRC message. The low PAPR DM-RS may have a DFT-s-OFDM waveform or a Zadoff-Chu Sequence, and the high PAPR RS may have an OFDM waveform. In some examples, the first message may be transmitted based on a change in a nonlinearity of a PA associated with the UE 120.

In an optional implementation (not shown), after transmitting the first message, the UE 120 may transmit, to the network node 502, a second message indicating a transition from a single high PAPR DM-RS within a single slot to the multiplexed low PAPR DM-RS and high PAPR RS within the single slot. In some such implementations, the second message may be a dynamic message included in UCI or a MAC-CE. In other such implementations, the second message may be a static message included in an RRC message. The second message may be an example of a flag that indicates the transition from the single high PAPR DM-RS to the multiplexed low PAPR DM-RS and high PAPR RS. In another optional implementation (not shown), after transmitting the first message, the UE 120 may transmit, to the network node 502, a second message indicating transmission of the high PAPR RS based on the OFDM waveform. The second message may be transmitted prior to an actual transmission of the high PAPR RS. In some such implementations, the second message may be a dynamic message included in UCI or a MAC-CE. In other such implementations, the second message may be a static message included in an RRC message. The second message may be an example of a flag that indicates the transmission of the high PAPR RS based on the OFDM waveform.

As shown in FIG. 5A, at time t2, the UE 120 may multiplex the low PAPR DM-RS with the high PAPR RS within the single slot. Furthermore, at time t3, the UE 120 may transmit, to the network node 502, the multiplexed low PAPR DM-RS and high PAPR RS within the single slot. Finally, at time t4, the network node 502 may transmit, to the UE 120, a measurement report indicating a channel estimate based on a measurement of the low PAPR DM-RS.

Figure 5B:
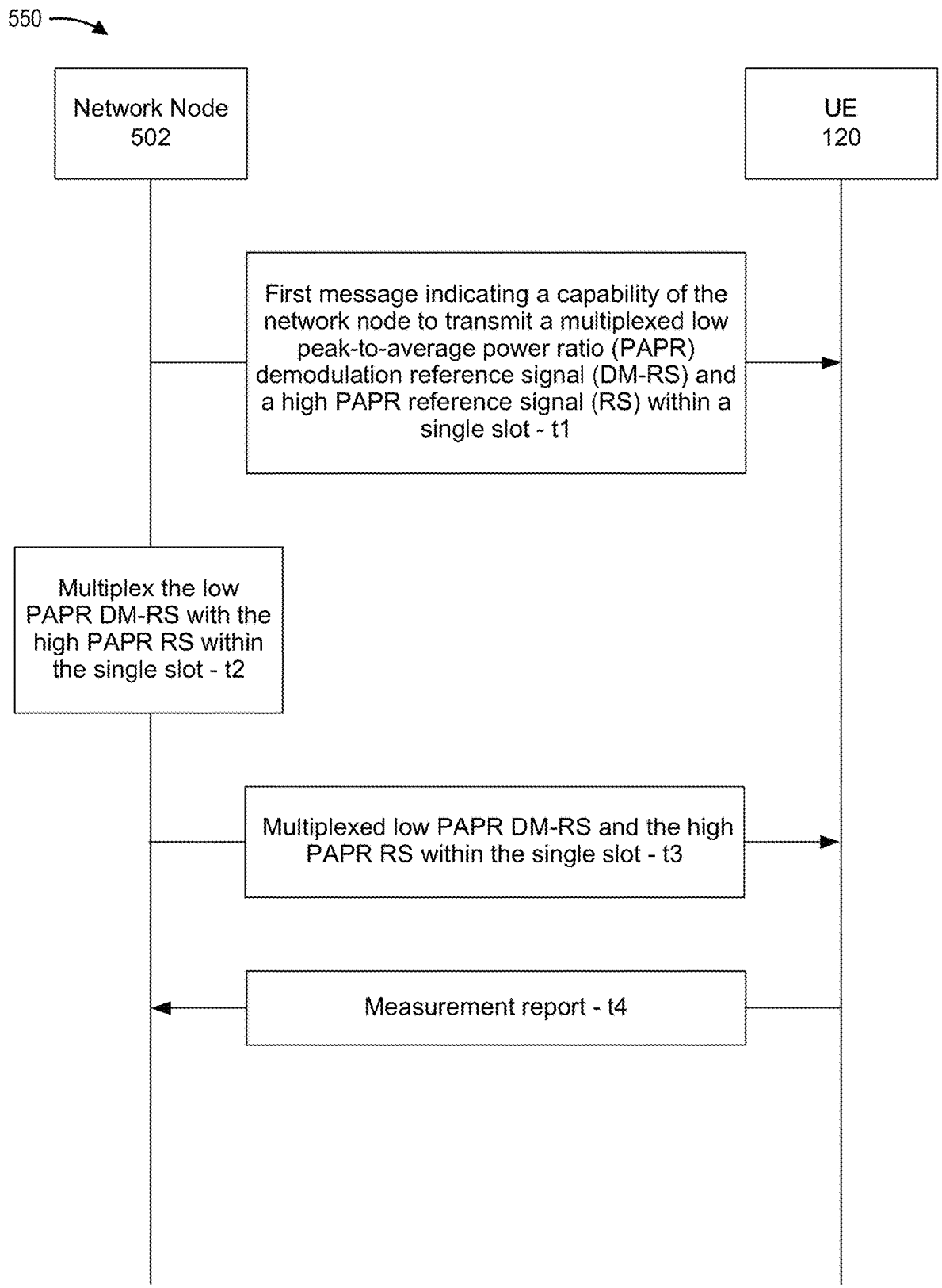
FIG. 5B is a timing diagram illustrating an example of multiplexing a low PAPR DM-RS and a high PAPR RS at a network node, in accordance with various aspects of the present disclosure.

FIG. 5B is a timing diagram 550 illustrating an example of multiplexing a low PAPR DM-RS and a high PAPR RS at a network node 502, in accordance with various aspects of the present disclosure. As shown in the example of FIG. 5B, the UE 120 may communicate with the network node 502. The network node 502 may be an example of a base station 110 as described with reference to FIGS. 1 and 2, a CU 310, DU 330, or RU 340 as described with reference to FIG. 3. In the example of FIG. 5B, the UE 120 may communicate with the network node 502 on a higher band (for example, FR4 and higher).

As shown in FIG. 5B, at time t1, the network node 502 may transmit, to the UE 120, a first message indicating a capability of the network node 502 to transmit a multiplexed low PAPR DM-RS and a high PAPR RS within a single slot. The first message may be a dynamic message included in downlink control information (DCI) or a MAC-CE. Alternatively, the first message may be a static message included in an RRC message. The low PAPR DM-RS may have a DFT-s-OFDM waveform or a Zadoff-Chu Sequence, and the high PAPR RS may have an OFDM waveform. In some examples, the first message may be transmitted based on a change in a nonlinearity of a PA associated with the network node 502.

In an optional implementation (not shown), prior to transmitting the first message, the network node 502 may receive, from the UE 120, another message indicating a capability of the UE 120 to receive (for example, process) the multiplexed low PAPR DM-RS and high PAPR RS within the single slot. The other message may indicate the UE 120 to mitigate nonlinear distortion based on the capability of the UE 120 to process the multiplexed low PAPR DM-RS and high PAPR RS within the single slot. The UE 120 may determine whether it is capable of processing the high PAPR RS to mitigate the nonlinear distortion. In some examples, the other message is a UE capability information message included in an RRC message.

In another optional implementation (not shown), after transmitting the first message, the network node 502 may transmit, to the UE 120, another message indicating a transition from a single high PAPR DM-RS within a single slot to the multiplexed low PAPR DM-RS and high PAPR RS within the single slot. In some such implementations, the other message may be a dynamic message included in DCI or a MAC-CE. In other such implementations, the second message may be a static message included in an RRC message. The other message may be an example of a flag that indicates the transition from the single high PAPR DM-RS to the multiplexed low PAPR DM-RS and high PAPR RS. In another optional implementation (not shown), after transmitting the first message, the network node 502 may transmit, to the UE 120, another message indicating transmission of the high PAPR RS based on the OFDM waveform. The other message may be transmitted prior to an actual transmission of the high PAPR RS. In some such implementations, the second message may be a dynamic message included in UCI or a MAC-CE. In other such implementations, the other message may be a static message included in an RRC message. The other message may be an example of a flag that indicates the transmission of the high PAPR RS based on the OFDM waveform.

As shown in FIG. 5B, at time t2, the network node 502 may multiplex the low PAPR DM-RS with the high PAPR RS within the single slot. Furthermore, at time t3, the network node 502 may transmit, to the UE 120, the multiplexed low PAPR DM-RS and high PAPR RS within the single slot. Finally, at time t4, the UE 120 may transmit a measurement report indicating a channel estimate based on a measurement of the low PAPR DM-RS.

In some examples, the transmission of the high PAPR RS may be dependent on a MCS level. For example, nonlinearity mitigation may not be needed for low order modulations, such as QPSK, with strong codes, such as MCS 1. Thus, in some such examples, the low PAPR DM-RS and the high PAPR RS are multiplexed and transmitted based on a value of an MCS being less than an MCS threshold.

As previously discussed, in higher bands, a primary source of nonlinearity may be based on a nonlinear PA. In some examples, the nonlinearity distortion caused by the nonlinear PA does not frequently change. Thus, in some other examples, the frequency of the high PAPR RS transmission may be based on a change in a PA of a transmitter, such as a PA associated with the UE 120 described with reference to FIG. 5A or a PA associated with the network node 502 described with reference to FIG. 5B. The change in the PA may be a change in a PA temperature or a PA operation point, for example.

In higher bands, analog beamforming with narrow beams may be used because channels may be mostly line of sight. Therefore, MIMO channels in these bands may be line of sight, and a MIMO channel matrix may be diagonal, which implies the MIMO precoding matrix is diagonal. In some examples, a transmitter, such as the UE 120 described with reference to FIG. 5A or the network node 502 described with reference to FIG. 5B, may transmit the multiplexed low PAPR DM-RS and high PAPR RS via a MIMO channel corresponding to a diagonal precoding matrix.

In some examples, a network node, such as the network node 502 described with reference to FIG. 5B, may frequency domain multiplex (FDM) a group of DM-RSs, where each DM-RS of the group of DM-RSs is intended for a respective UE of a group of UEs. In some such examples, frequency domain multiplexing RSs, such as DM-RSs, for multiple UEs may result in a high PAPR waveform. For example, if a group of low PAPR DM-RS are frequency domain multiplexed, the resulting time domain signal may have a high PAPR waveform, which reduces an accuracy of a linear channel estimate at a UE. Therefore, the network node may determine whether multiplexing a group of DM-RSs in the frequency domain may result in a low PAPR DM-RS for each UE of a group of UEs. If the frequency domain multiplexing of the group of DM-RSs results in the low PAPR DM-RS, the network node may transmit a message, such as the first message described with reference to FIG. 5B, indicating a capability of the network node to transmit a multiplexed low PAPR DM-RS and a high PAPR RS within a single slot. If the frequency domain multiplexing of the group of DM-RSs does not result in the low PAPR DM-RS, the network node may only transmit a high PAPR DM-RS using an OFDM waveform and will not transmit the multiplexed low PAPR DM-RS and the high PAPR RS.

Figure 6:
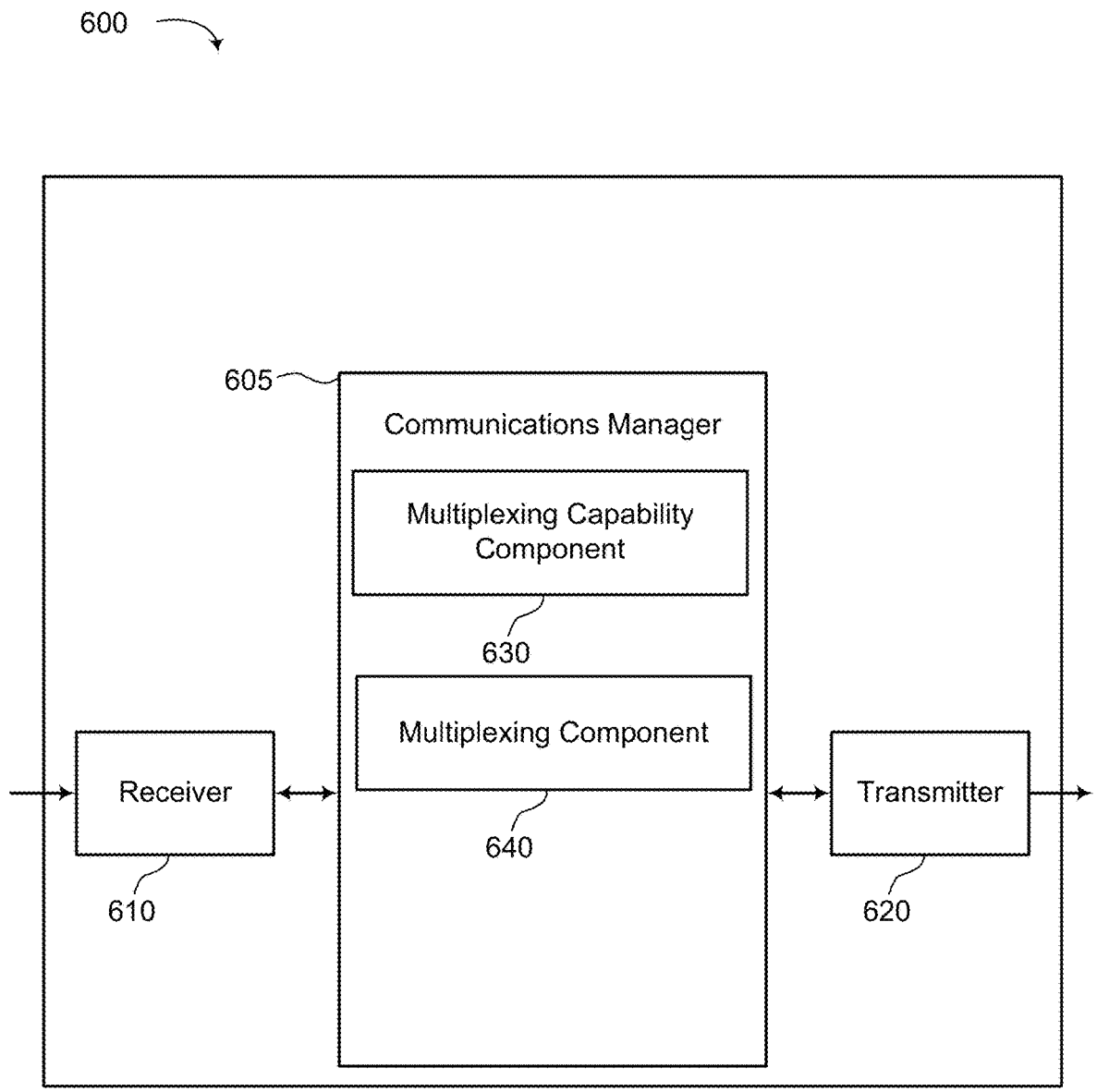
FIG. 6 is a block diagram illustrating an example wireless communication device that supports transmitting a multiplexed low PAPR DM-RS and a high PAPR RS within a single slot, in accordance with some aspects of the present disclosure.

FIG. 6 is a block diagram illustrating an example wireless communication device 600 that supports transmitting a multiplexed low PAPR DM-RS and a high PAPR RS within a single slot, in accordance with some aspects of the present disclosure. The device 600 may be an example of aspects of a UE 120 described with reference to FIGS. 1, 2, 3, and 5A. The wireless communication device 600 may include a receiver 610, a communications manager 605, a transmitter 620, a multiplexing capability component 630, and multiplexing component 640 which may be in communication with one another (for example, via one or more buses). In some examples, the wireless communication device 600 is configured to perform operations, including operations of the process 700 described below with reference to FIG. 7.

In some examples, the wireless communication device 600 can include a chip, chipset, package, or device that includes at least one processor and at least one modem (for example, a 5G modem or other cellular modem). In some examples, the communications manager 605, or its subcomponents, may be separate and distinct components. In some examples, at least some components of the communications manager 605 are implemented at least in part as software stored in a memory. For example, portions of one or more of the components of the communications manager 605 can be implemented as non-transitory code executable by the processor to perform the functions or operations of the respective component.

The receiver 610 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel (PSCCH) and data channels (for example, a physical downlink shared channel (PDSCH), physical sidelink shared channel (PSSCH), a physical uplink shared channel (PUSCH)). The other wireless communication devices may include, but are not limited to, a base station 110 as described with reference to FIGS. 1 and 2, a CU 310, DU 330, or RU 340 as described with reference to FIG. 3, or a network node 502 described with reference to FIGS. 5A and 5B.

The received information may be passed on to other components of the device 600. The receiver 610 may be an example of aspects of the receive processor 256 described with reference to FIG. 2. The receiver 610 may include a set of radio frequency (RF) chains that are coupled with or otherwise utilize a set of antennas (for example, the set of antennas may be an example of aspects of the antennas 252 described with reference to FIG. 2).

The transmitter 620 may transmit signals generated by the communications manager 605 or other components of the wireless communication device 600. In some examples, the transmitter 620 may be collocated with the receiver 610 in a transceiver. The transmitter 620 may be an example of aspects of the transmit processor 266 described with reference to FIG. 2. The transmitter 620 may be coupled with or otherwise utilize a set of antennas (for example, the set of antennas may be an example of aspects of the antennas 252 described with reference to FIG. 2), which may be antenna elements shared with the receiver 610. In some examples, the transmitter 620 is configured to transmit control information in a PUCCH, PSCCH, or PDCCH and data in a physical uplink shared channel (PUSCH), PSSCH, or PDSCH.

The communications manager 605 may be an example of aspects of the controller/processor 259 described with reference to FIG. 2. The communications manager 605 may include the multiplexing capability component 630 and the multiplexing component 640. In some examples, working in conjunction with the transmitter 620, the multiplexing capability component 630 may transmit, to a network node, a first message indicating a capability of the UE to transmit a multiplexed low PAPR DM-RS and a high PAPR RS within a single slot. Additionally, working in conjunction with the multiplexing capability component 630, the multiplexing component 640 may multiplex, associated with the capability, the low PAPR DM-RS with the high PAPR RS within the single slot. Finally, working in conjunction with the transmitter, the multiplexing component 640 may transmit, to the network node, the multiplexed low PAPR DM-RS and high PAPR RS within the single slot.

Figure 7:
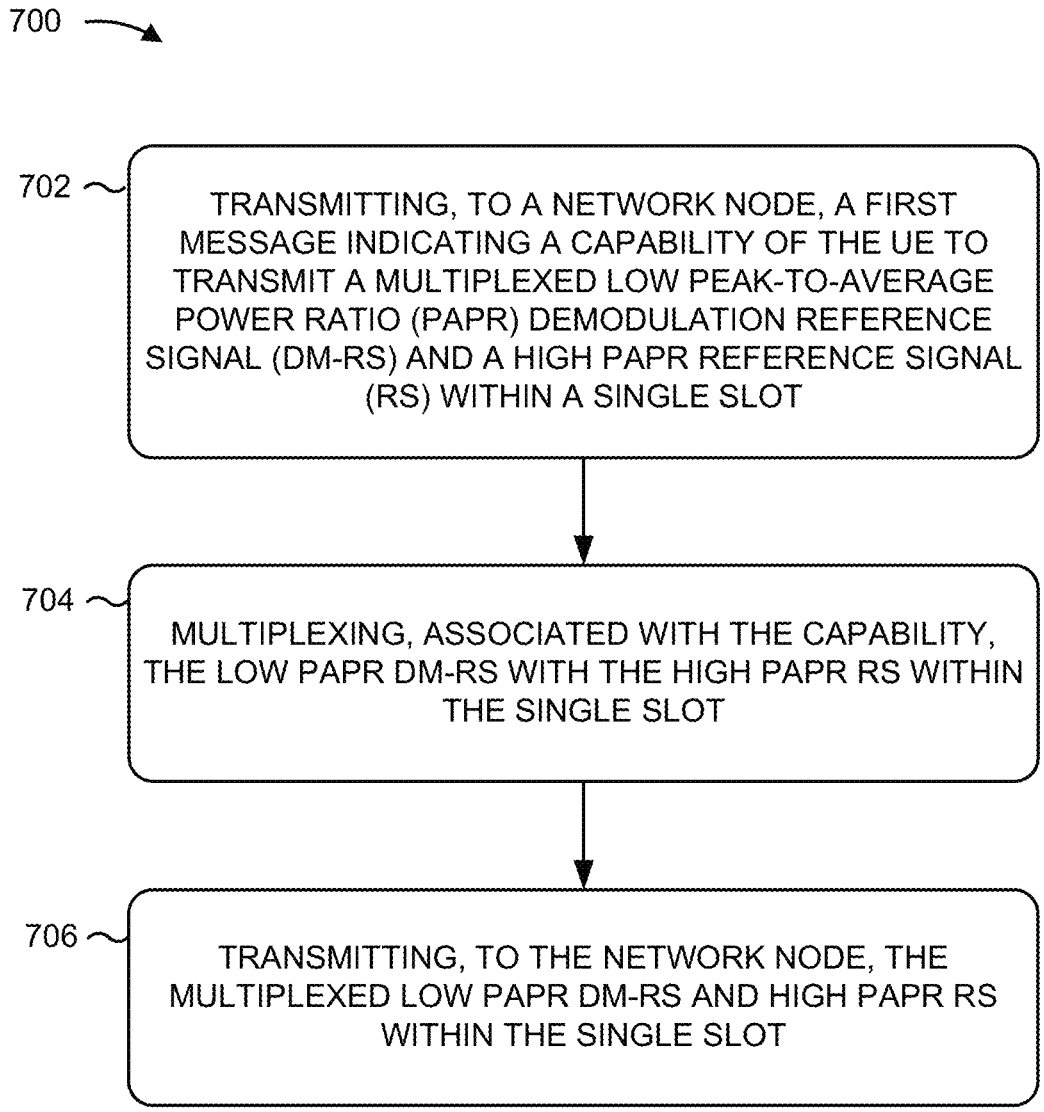
FIG. 7 is a flow diagram illustrating an example process performed by a UE, in accordance with some aspects of the present disclosure.

FIG. 7 is a flow diagram illustrating an example process 700 performed by a UE 120, in accordance with some aspects of the present disclosure. The example process 700 is an example of transmitting a multiplexed low PAPR DM-RS and a high PAPR RS within a single slot. As shown in FIG. 7, the process 700 begins at block 702 by transmitting, to a network node, a first message indicating a capability of the UE to transmit a multiplexed low PAPR DM-RS and a high PAPR RS within a single slot. Additionally, at block 704, the process 700 multiplexes, associated with the capability, the low PAPR DM-RS with the high PAPR RS within the single slot. Finally, at block 706, the process 700 transmits, to the network node, the multiplexed low PAPR DM-RS and high PAPR RS within the single slot.

Figure 8:
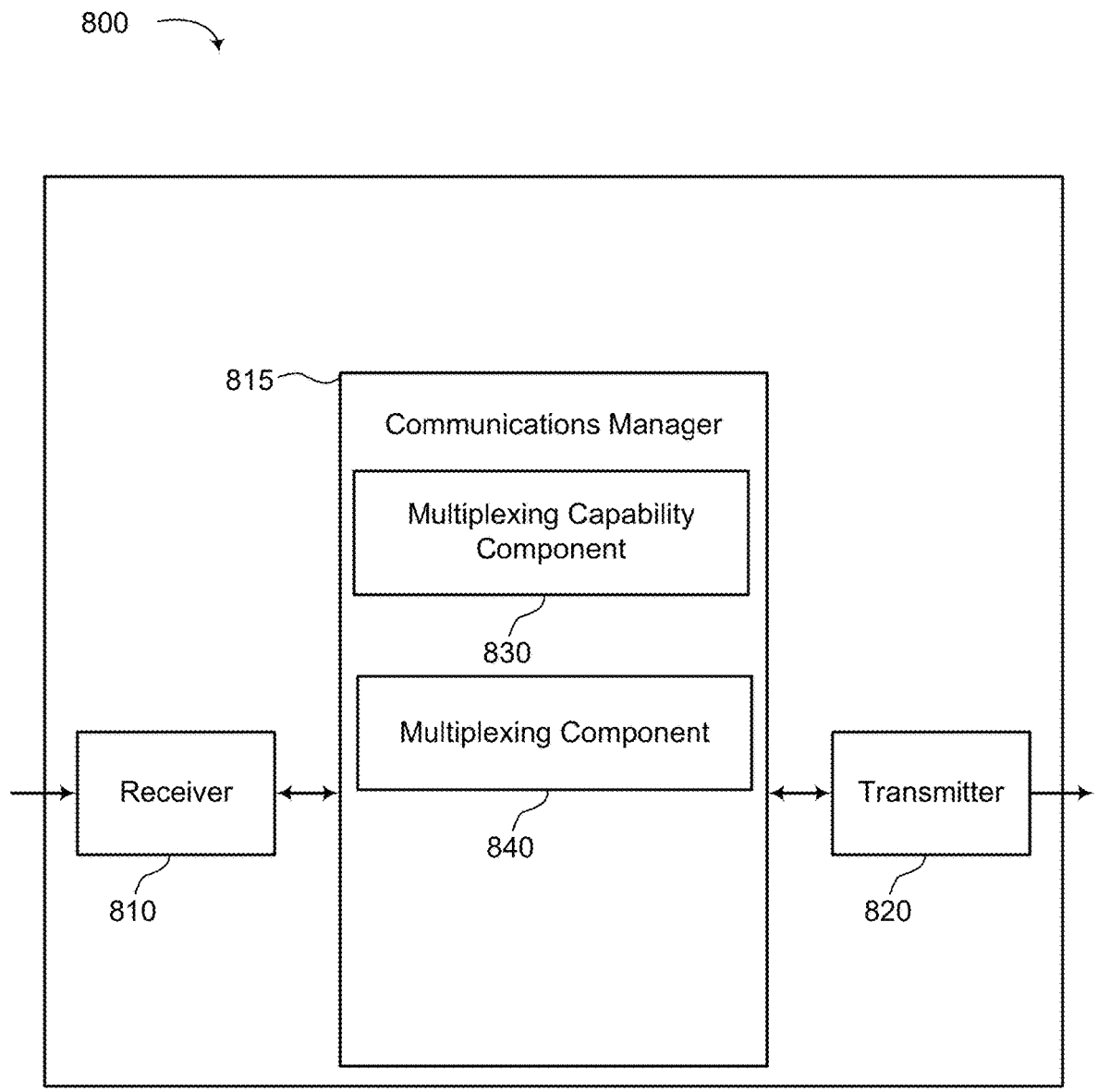
FIG. 8 is a block diagram illustrating an example wireless communication device that supports transmitting a multiplexed low PAPR DM-RS and a high PAPR RS within a single slot, in accordance with aspects of the present disclosure.

FIG. 8 is a block diagram illustrating an example wireless communication device 800 that supports transmitting a multiplexed low PAPR DM-RS and a high PAPR RS within a single slot, in accordance with aspects of the present disclosure. The wireless communication device 800 may be an example of a base station 110 as described with reference to FIGS. 1 and 2, a CU 310, DU 330, or RU 340 as described with reference to FIG. 3, or network node 502 described with reference to FIG. 5B. The wireless communication device 800 may include a receiver 810, a communications manager 815, a multiplexing capability component 830, a multiplexing component 840, and a transmitter 820, which may be in communication with one another (for example, via one or more buses). In some examples, the wireless communication device 800 is configured to perform operations, including operations of the process 900 described below with reference to FIG. 9.

In some examples, the wireless communication device 800 can include a chip, system on chip (SOC), chipset, package, or device that includes at least one processor and at least one modem (for example, a 5G modem or other cellular modem). In some examples, the communications manager 815, or its sub-components, may be separate and distinct components. In some examples, at least some components of the communications manager 815 are implemented at least in part as software stored in a memory. For example, portions of one or more of the components of the communications manager 815 can be implemented as non-transitory code executable by the processor to perform the functions or operations of the respective component.

The receiver 810 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a PSCCH) and data channels (for example, a PUSCH or a PSSCH). The other wireless communication devices may include, but are not limited to, a UE 120, described with reference to FIGS. 1, 2, 3, 5A and 5B.

The received information may be passed on to other components of the wireless communication device 800. The receiver 810 may be an example of aspects of the receive processor 270 described with reference to FIG. 2. The receiver 810 may include a set of radio frequency (RF) chains that are coupled with or otherwise utilize a set of antennas (for example, the set of antennas may be an example of aspects of the antennas 234 described with reference to FIG. 2).

The transmitter 820 may transmit signals generated by the communications manager 815 or other components of the wireless communication device 800. In some examples, the transmitter 820 may be collocated with the receiver 810 in a transceiver. The transmitter 820 may be an example of aspects of the transmit processor 216 described with reference to FIG. 2. The transmitter 820 may be coupled with or otherwise utilize a set of antennas (for example, the set of antennas may be an example of aspects of the antennas 252), which may be antenna elements shared with the receiver 810. In some examples, the transmitter 820 is configured to transmit control information in a PDCCH or a PSCCH and data in a PDSCH or PSSCH.

The communications manager 815 may be an example of aspects of the controller/processor 275 described with reference to FIG. 2. The communications manager 815 includes the multiplexing capability component 830 and the multiplexing component 840. In some examples, working in conjunction with the transmitter 820, the multiplexing capability component 830 transmits a first message indicating a capability of the network node to transmit a multiplexed low PAPR DM-RS and another PAPR RS within a single slot. Furthermore, working in conjunction with the multiplexing capability component 830, the multiplexing component 840 multiplexes, associated with the capability, the low PAPR DM-RS with the high PAPR RS within the single slot. Finally, working in conjunction with the transmitter 820, the multiplexing component 840 transmits the multiplexed PAPR DM-RS and high PAPR RS within the single slot.

Figure 9:
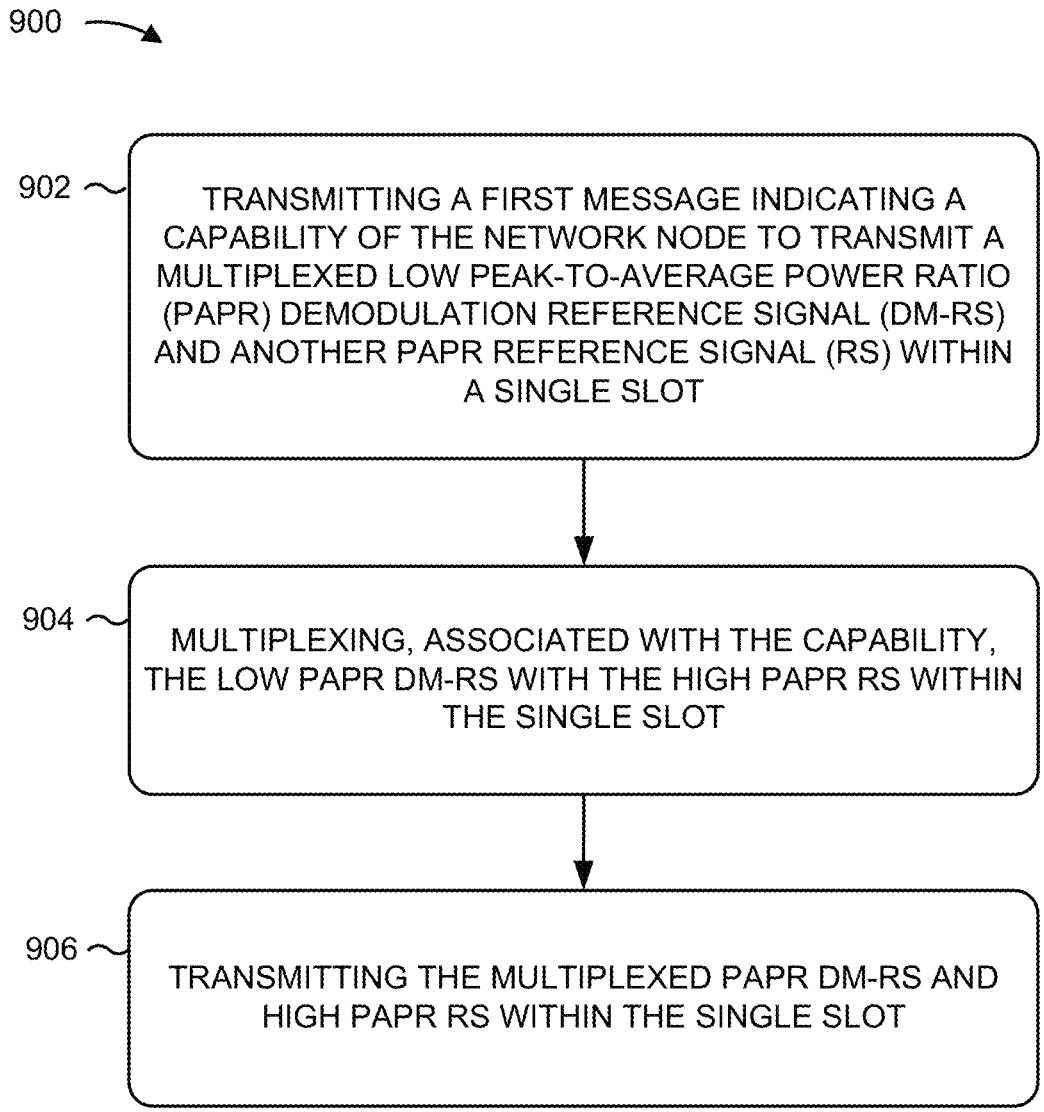
FIG. 9 is a flow diagram illustrating an example process performed by a network node, in accordance with some aspects of the present disclosure.

FIG. 9 is a flow diagram illustrating an example process 900 performed by a network node, in accordance with some aspects of the present disclosure. The example process 900 is an example of transmitting a multiplexed low PAPR DM-RS and a high PAPR RS within a single slot. As shown in FIG. 9, the process 900 begins at block 902 by transmitting a multiplexed low PAPR DM-RS and another PAPR RS within a single slot. Furthermore, at block 904, the process 900 multiplexes, associated with the capability, the low PAPR DM-RS with the high PAPR RS within the single slot. Finally, at block 906, the process 900 transmits the multiplexed PAPR DM-RS and high PAPR RS within the single slot.

Implementation examples are described in the following numbered clauses:

Clause 1. A method for wireless communication by a UE, comprising: transmitting, to a network node, a first message indicating a capability of the UE to transmit a multiplexed low PAPR DM-RS and a high PAPR RS within a single slot; multiplexing, associated with the capability, the low PAPR DM-RS with the high PAPR RS within the single slot; and transmitting, to the network node, the multiplexed low PAPR DM-RS and high PAPR RS within the single slot.

Clause 2. The method of Clause 1, wherein: the low PAPR DM-RS has a DFT-s-OFDM waveform or a Zadoff-Chu Sequence; and the high PAPR RS has an OFDM waveform.

Clause 3. The method of any one of Clauses 1-2, wherein the first message is: a dynamic message included in UCI or a MAC-CE; or a static message included in a RRC message.

Clause 4. The method of any one of Clauses 1-3, further comprising transmitting, to the network node, associated with transmitting the first message, a second message indicating a transition from a single high PAPR DM-RS to the multiplexed low PAPR DM-RS and high PAPR RS within the single slot.

Clause 5. The method of any one of Clauses 1-4, wherein: the low PAPR DM-RS uses a first waveform with a first PAPR that is less than a PAPR threshold; and the high PAPR RS uses a second waveform with a second PAPR that is greater than or equal to the PAPR threshold.

Clause 6. The method of any one of Clauses 1-5, wherein the low PAPR DM-RS and the high PAPR RS are multiplexed and transmitted based on a value of a MCS being less than an MCS threshold.

Clause 7. The method of any one of Clauses 1-5, wherein the low PAPR DM-RS and the high PAPR RS are multiplexed and transmitted based on a change in a PA associated with the UE.

Clause 8. The method of any one of Clauses 1-7, wherein the multiplexed low PAPR DM-RS and high PAPR RS are transmitted via a MIMO channel corresponding to a diagonal precoding matrix.

Clause 9. A method for wireless communication by a network node, comprising: transmitting a first message indicating a capability of the network node to transmit a multiplexed low PAPR DM-RS and another PAPR RS within a single slot; multiplexing, associated with the capability, the low PAPR DM-RS with the high PAPR RS within the single slot; and transmitting the multiplexed PAPR DM-RS and high PAPR RS within the single slot.

Clause 10. The method of Clause 9, wherein: the low PAPR DM-RS has a DFT-s-OFDM waveform or a Zadoff-Chu Sequence; and the high PAPR RS has an OFDM waveform.

Clause 11. The method of any one of Clauses 9-10, wherein the first message is: a dynamic message included in DCI or a MAC-CE; or a static message included in an RRC message.

Clause 12. The method of any one of Clauses 9-11, further comprising transmitting associated with transmitting the first message, a second message indicating a transition from a single PAPR DM-RS to the multiplexed low PAPR DM-RS and high PAPR RS within the single slot.

Clause 13. The method of any one of Clauses 9-12, wherein: the low PAPR DM-RS uses a first waveform with a first PAPR that is less than a PAPR threshold; and the high PAPR RS uses a second waveform with a second PAPR that is greater than or equal to the PAPR threshold.

Clause 14. The method of any one of Clauses 9-13, wherein the low PAPR DM-RS and the high PAPR RS are multiplexed and transmitted based on a value of a MCS being less than an MCS threshold.

Clause 15. The method of any one of Clauses 9-13, wherein the low PAPR DM-RS and the high PAPR RS are multiplexed and transmitted based on a change in a PA associated with the network node.

Clause 16. The method of any one of Clauses 9-15, wherein the multiplexed low PAPR DM-RS and high PAPR RS are transmitted via a MIMO channel corresponding to a diagonal precoding matrix.

Clause 17. The method of any one of Clauses 9-16, further comprising receiving, from a UE, a second message indicating a capability of the UE to process the multiplexed low PAPR DM-RS and high PAPR RS within the single slot.

Clause 18. The method of Clause 17, wherein the second message is a UE capability information message included in an RRC message.

Clause 19. The method of any one of Clauses 9-18, further comprising: frequency division multiplexing a group of DM-RSs; and transmitting the frequency division multiplexed group of DM-RSs, wherein the low PAPR DM-RS and the high PAPR RS are multiplexed and transmitted based on a PAPR associated with a frequency division multiplexed group of DM-RS being less than a PAPR threshold.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a user equipment (UE), comprising:
    transmitting, to a network node, a first message indicating a capability of the UE to transmit a multiplexed low peak-to-average power ratio (PAPR) demodulation reference signal (DM-RS) and a high PAPR reference signal (RS) within a single slot;
    multiplexing, associated with the capability, the low PAPR DM-RS with the high PAPR RS within the single slot, such that each of the low PAPR DM-RS and the high PAPR RS is allocated to a respective single symbol of the single slot in accordance with the multiplexing, remaining symbols of the single slot being allocated to high PAPR data; and
    transmitting, to the network node, the multiplexed low PAPR DM-RS and high PAPR RS within the single slot.

2. The method of claim 1, wherein:
    the low PAPR DM-RS has a discrete Fourier transform (DFT) spread orthogonal frequency division multiplexing (OFDM) (DFT-s-OFDM) waveform or a Zadoff-Chu Sequence; and
    the high PAPR RS has an OFDM waveform.

3. The method of claim 1, wherein the first message is:
    a dynamic message included in uplink control information (UCI) or a medium access control (MAC) control element (CE) (MAC-CE); or
    a static message included in a radio resource control (RRC) message.

4. The method of claim 1, further comprising transmitting, to the network node, associated with transmitting the first message, a second message indicating a transition from a single high PAPR DM-RS to the multiplexed low PAPR DM-RS and high PAPR RS within the single slot.

5. The method of claim 1, wherein:
    the low PAPR DM-RS uses a first waveform with a first PAPR that is less than a PAPR threshold; and
    the high PAPR RS uses a second waveform with a second PAPR that is greater than or equal to the PAPR threshold.

6. The method of claim 1, wherein the low PAPR DM-RS and the high PAPR RS are multiplexed and transmitted based on a value of a modulation and coding scheme (MCS) being less than an MCS threshold.

7. The method of claim 1, wherein the low PAPR DM-RS and the high PAPR RS are multiplexed and transmitted based on a change in a power amplifier (PA) associated with the UE.

8. The method of claim 1, wherein the multiplexed low PAPR DM-RS and high PAPR RS are transmitted via a multiple-input multiple-output (MIMO) channel corresponding to a diagonal precoding matrix.

9. An apparatus for wireless communications at a user equipment (UE), comprising:
    a processor; and
    a memory coupled with the processor and storing instructions operable, when executed by the processor, to cause the apparatus to:
        transmit, to a network node, a first message indicating a capability of the UE to transmit a multiplexed low peak-to-average power ratio (PAPR) demodulation reference signal (DM-RS) and a high PAPR reference signal (RS) within a single slot;
        multiplex, associated with the capability, the low PAPR DM-RS with the high PAPR RS within the single slot, such that each of the low PAPR DM-RS and the high PAPR RS is allocated to a respective single symbol of the single slot in accordance with the multiplexing, remaining symbols of the single slot being allocated to high PAPR data; and
        transmit, to the network node, the multiplexed low PAPR DM-RS and high PAPR RS within the single slot.

10. The apparatus of claim 9, wherein:
    the low PAPR DM-RS has a discrete Fourier transform (DFT) spread orthogonal frequency division multiplexing (OFDM) (DFT-s-OFDM) waveform or a Zadoff-Chu Sequence; and
    the high PAPR RS has an OFDM waveform.

11. The apparatus of claim 9, wherein the first message is:
    a dynamic message included in uplink control information (UCI) or a medium access control (MAC) control element (CE) (MAC-CE); or a static message included in a radio resource control (RRC) message.

12. The apparatus of claim 9, wherein execution of the instructions further cause the apparatus to transmit, to the network node, associated with transmitting the first message, a second message indicating a transition from a single high PAPR DM-RS to the multiplexed low PAPR DM-RS and high PAPR RS within the single slot.

13. The apparatus of claim 9, wherein:
the low PAPR DM-RS uses a first waveform with a first PAPR that is less than a PAPR threshold; and
the high PAPR RS uses a second waveform with a second PAPR that is greater than or equal to the PAPR threshold.

14. A method for wireless communication by a network node, comprising:
transmitting a first message indicating a capability of the network node to transmit a multiplexed low peak-to-average power ratio (PAPR) demodulation reference signal (DM-RS) and another PAPR reference signal (RS) within a single slot;
multiplexing, associated with the capability, the low PAPR DM-RS with the high PAPR RS within the single slot, such that each of the low PAPR DM-RS and the high PAPR RS is allocated to a respective single symbol of the single slot, remaining symbols of the single slot being allocated to high PAPR data; and
transmitting the multiplexed PAPR DM-RS and high PAPR RS within the single slot.

15. The method of claim 14, wherein:
the low PAPR DM-RS has a discrete Fourier transform (DFT) spread orthogonal frequency division multiplexing (OFDM) (DFT-s-OFDM) waveform or a Zadoff-Chu Sequence; and
the high PAPR RS has an OFDM waveform.

16. The method of claim 14, wherein the first message is:
a dynamic message included in downlink control information (DCI) or a medium access control (MAC) control element (CE) (MAC-CE); or
a static message included in a radio resource control (RRC) message.

17. The method of claim 14, further comprising transmitting associated with transmitting the first message, a second message indicating a transition from a single PAPR DM-RS to the multiplexed low PAPR DM-RS and high PAPR RS within the single slot.

18. The method of claim 14, wherein:
the low PAPR DM-RS uses a first waveform with a first PAPR that is less than a PAPR threshold; and
the high PAPR RS uses a second waveform with a second PAPR that is greater than or equal to the PAPR threshold.

19. The method of claim 14, wherein the low PAPR DM-RS and the high PAPR RS are multiplexed and transmitted based on a value of a modulation and coding scheme (MCS) being less than an MCS threshold.

20. The method of claim 14, wherein the low PAPR DM-RS and the high PAPR RS are multiplexed and transmitted based on a change in a power amplifier (PA) associated with the network node.

21. The method of claim 14, wherein the multiplexed low PAPR DM-RS and high PAPR RS are transmitted via a multiple-input multiple-output (MIMO) channel corresponding to a diagonal precoding matrix.

22. The method of claim 14, further comprising receiving, from a user equipment (UE), a second message indicating a capability of the UE to process the multiplexed low PAPR DM-RS and high PAPR RS within the single slot.

23. The method of claim 22, wherein the second message is a UE capability information message included in a radio resource control (RRC) message.

24. The method of claim 14, further comprising:
frequency division multiplexing a group of DM-RSs; and
transmitting the frequency division multiplexed group of DM-RSs, wherein the low PAPR DM-RS and the high PAPR RS are multiplexed and transmitted based on a PAPR associated with a frequency division multiplexed group of DM-RS being less than a PAPR threshold.

25. An apparatus for wireless communications at a network node, comprising:
a processor; and
a memory coupled with the processor and storing instructions operable, when executed by the processor, to cause the apparatus to:
transmit a first message indicating a capability of the network node to transmit a multiplexed low peak-to-average power ratio (PAPR) demodulation reference signal (DM-RS) and another PAPR reference signal (RS) within a single slot;
multiplex, associated with the capability, the low PAPR DM-RS with the high PAPR RS within the single slot, such that each of the low PAPR DM-RS and the high PAPR RS is allocated to a respective single symbol of the single slot in accordance with the multiplexing, remaining symbols of the single slot being allocated to high PAPR data; and
transmit the multiplexed PAPR DM-RS and high PAPR RS within the single slot.

26. The apparatus of claim 25, wherein:
the low PAPR DM-RS has a discrete Fourier transform (DFT) spread orthogonal frequency division multiplexing (OFDM) (DFT-s-OFDM) waveform or a Zadoff-Chu Sequence; and
the high PAPR RS has an OFDM waveform.

27. The apparatus of claim 25, wherein the first message is:
a dynamic message included in downlink control information (DCI) or a medium access control (MAC) control element (CE) (MAC-CE); or
a static message included in a radio resource control (RRC) message.

28. The apparatus of claim 25, wherein execution of the instructions further cause the apparatus to transmit associated with transmitting the first message, a second message indicating a transition from a single PAPR DM-RS to the multiplexed low PAPR DM-RS and high PAPR RS within the single slot.

29. The apparatus of claim 25, wherein:
the low PAPR DM-RS uses a first waveform with a first PAPR that is less than a PAPR threshold; and
the high PAPR RS uses a second waveform with a second PAPR that is greater than or equal to the PAPR threshold.

30. The apparatus of claim 25, wherein execution of the instructions further cause the apparatus to:
frequency division multiplex a group of DM-RSs; and
transmit the frequency division multiplexed group of DM-RSs, wherein the low PAPR DM-RS and the high PAPR RS are multiplexed and transmitted based on a PAPR associated with a frequency division multiplexed group of DM-RS being less than a PAPR threshold.

* * * * *